United States Patent [19]

Olsen et al.

[11] 4,235,271
[45] Nov. 25, 1980

[54] TIRE SIDEWALL PROTECTOR SHIELD ASSEMBLY

[75] Inventors: Richard J. Olsen, Massillon; George T. Watts, North Canton; Robert I. Griffiths, Akron, all of Ohio

[73] Assignee: The Goodyear Tire & Rubber Company, Akron, Ohio

[21] Appl. No.: 57,227

[22] Filed: Jul. 13, 1979

[51] Int. Cl.³ .......................... B60C 19/12; B62B 9/16
[52] U.S. Cl. ................................ 152/186; 152/154; 152/189; 280/156; 301/37 ST
[58] Field of Search ............... 152/154, 185, 186, 189, 152/170, 174, 190, 242, 365, DIG. 1, 177; 280/156; 301/37 ST, 37 TC

[56] References Cited

U.S. PATENT DOCUMENTS

| | | | |
|---|---|---|---|
| 967,806 | 8/1910 | Meyer | 152/186 |
| 1,140,778 | 5/1915 | Trigalet | 152/185 |
| 1,235,251 | 7/1917 | Self | 280/156 |
| 1,867,518 | 7/1932 | MacLean et al. | 152/154 |
| 1,905,674 | 4/1933 | Babbs | 152/154 |
| 3,187,797 | 6/1965 | Fletcher et al. | 152/154 |

FOREIGN PATENT DOCUMENTS 40566  3/1907  Switzerland ..................... 152/186

OTHER PUBLICATIONS

European Patent 7981, 2/1980, "Sidewall Protector for a Tire," Dadds et al.
WO 79/00425, 7/1979, "Tire Sidewall Protector for Multipiece Rim Wheels," Shiffler et al.

Primary Examiner—Michael G. Wityshyn
Attorney, Agent, or Firm—D. M. Ronyak

[57] ABSTRACT

A removable resilient shield is maintained proximate the sidewall of a tire for off-the-road vehicles to protect this critical area of the tire from damage due to contact with external objects such as rocks. The shield is secured to the terminal portion of the rim flange. The radially inner portion of the shield is spaced axially of the rim and at least one radially extending passage is provided for removal of debris from between the shield and the sidewall of a tire mounted on the rim.

15 Claims, 6 Drawing Figures

TIRE SIDEWALL PROTECTOR SHIELD ASSEMBLY

The foregoing abstract is not to be taken as limiting the invention of this application and in order to understand the full nature and extent of the technical disclosure of this application reference must be made to the accompanying drawings and the following detailed description.

The invention relates to protection of the sidewalls of vehicle tires which operate off the road. In such tires the sidewalls are vulnerable to damage from sharply pointed rocks or other material which the tire is likely to encounter as it rolls over rough terrain for which off-the-road type vehicles are designed to operate.

The invention may be used with any tire; however, it is most useful with a tire whose service conditions are such as to cause failure of the tire through damage to the tire sidewalls from contact with external objects. The invention is particularly well suited to the protection of one or both of the lower or radially inner portions of the sidewalls of large off-the-road type tires and especially those of a design which includes a replaceable tread or traction belt. It may be used in conjunction with an upper sidewall protection device, an example of which is shown in U.S. Pat. No. 4,030,530. In a tire of a design including a replaceable tread or traction belt, the tire sidewalls are subjected to increased possibility of damage because of their intended prolonged service life. As shown in FIG. 1, such a tire 10 includes a fluid impervious innerliner 11 which is surrounded by a carcass 12 that is composed of an appropriate number of individual plies or rubberized reinforcement cords depending on the size of the tire. An undertread 13 and a pair of sidewalls 14,15 cover the tire carcass and terminate at a pair of inextensible annular beads 16,17. A traction element 18 is removably mounted around the outer periphery of the tire. The traction element 18 may be a removable tread (as shown in FIG. 1) mounted around the outer periphery of the tire. Alternatively, the traction element 18 may include a removable reinforced continuous rubber tread band provided with a circumferential recess for receiving a rubber belt. A plurality of traction shoes or grouser bars are fastened to the tread band. The invention is particularly useful in the protection of the lower sidewall areas of this type of tire. However, it may be used with any tire for which protection of a sidewall is required.

Past efforts for the protection of the sidewall of a tire have included a resilient shield fastened adjacent the tread of a tire. The shield in some instances has been extended from its attachment point adjacent the tread of the tire to the tire rim flange where the shield was also secured. A sectional annular shield has also been attached to the rim flange by means of a plurality of removable fasteners circumferentially spaced about the rim flange, the shield being retained between the rim flange and ring segments by the removable fastening means.

It is believed that the prior art devices have not been entirely satisfactory for use in attaching an annular tire sidewall shield for protection of a tire intended for off-the-road operation. Some of the prior art attachment devices have been laborious to assemble. Some of the prior art attachment devices may be easily damaged or knocked off the tire and rim assembly when the shield or attachment devices receive a blow which deforms it sufficiently. Additionally, when the sidewall shield has been attached to the rim or wheel so as to position the radially inner portion of the shield adjacent the tire sidewall and rim flange dirt, sand and other debris have become entrapped between the tire sidewall and the shield. Accumulation of debris in this area may result in damage to the tire sidewall during continued operation of the tire due to abrasion of the tire sidewall.

SUMMARY OF THE INVENTION

It is an object of one aspect of the invention to provide a tire sidewall protector which reduces or eliminates entrapment of debris between the protector and associated sidewall of the tire.

It is an object of another aspect of the invention to provide a tire sidewall protector which is not readily dislodged upon impact with an obstacle during operation of the vehicle upon which the assembly is mounted.

These and other objects and advantages of the invention will become apparent as the description proceeds.

An annular tire sidewall protection shield is removably attached to the flange of the tire rim. The tire rim includes a tire-supporting flange axially spaced from its centerplane. The tire rim flange terminates in a portion directed generally radially inwardly toward the axis of rotation of the rim. Preferably the terminal portion of the rim flange includes a plurality of generally axially extending apertures spaced apart about its circumference. Preferably, a plurality of spacers abuts the rim flange in a generally axial direction. The spacers are positioned apart from one another about the circumference of the terminal portion of the rim flange. Each of the spacers includes an aperture extending generally axially therethrough. An annular resilient shield axially abuts said plurality of spacers. The shield extends radially outwardly of the axis of rotation of the tire rim from a radius corresponding to that of the terminal portion of the rim flange. An annular ring is in axial contact with the shield. The ring has a plurality of apertures extending generally in an axial direction therethrough. The apertures of the ring are spaced apart about the circumference of the ring. The apertures of the components are aligned and removable fastening means extend therethrough in a generally axial direction to secure the components to the terminal portion of the rim flange.

Alternatively, two annular rings are employed. The first annular ring is positioned between the plurality of spacers and the shield. The second annular ring contacts only the shield as described above.

In the absence of a plurality of apertures extending generally in an axial direction and spaced apart about the circumference of the terminal portion of the rim flange, a plurality of clips, each having an aperture extending generally axially therethrough contact the surface of the terminal portion of the rim flange nearest the centerplane of the rim.

The spacers may be separate blocks or a stack of ordinary flat washers. Preferably, the spacers are permanently fastened to or integrally formed with one of the other components of the assembly. Each spacer may be of L-shaped configuration as viewed in a radial plane of the shield and rim assembly and may contain on its surface nearest the centerplane of the rim a raised boss to aid in centering of the ring concentric with the rim flange.

BRIEF DESCRIPTION OF THE DRAWINGS

The description of the invention will be better understood by having reference to the annexed drawings in which.

DETAILED DESCRIPTION OF THE INVENTION

Figure 1:
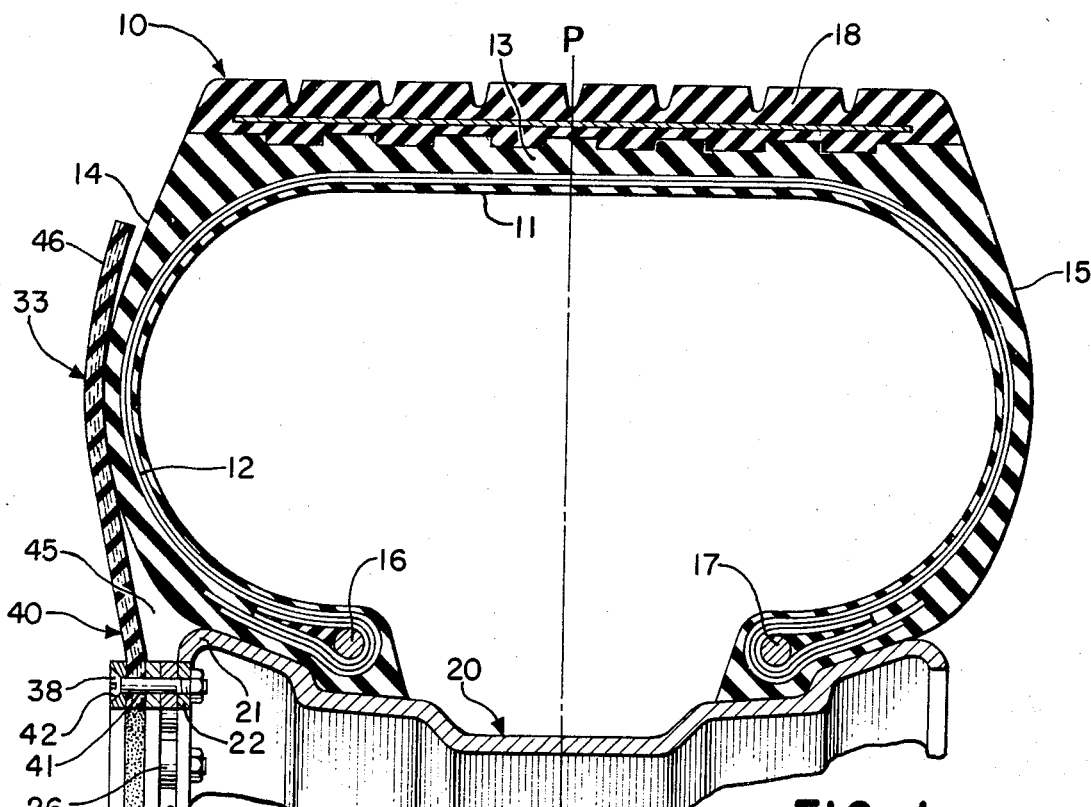
FIG. 1 is a fragmentary view taken in section along a plane containing the axis of rotation of a tire and rim assembly showing a preferred embodiment of the tire sidewall protector shield assembly of the invention.
Figure 2:
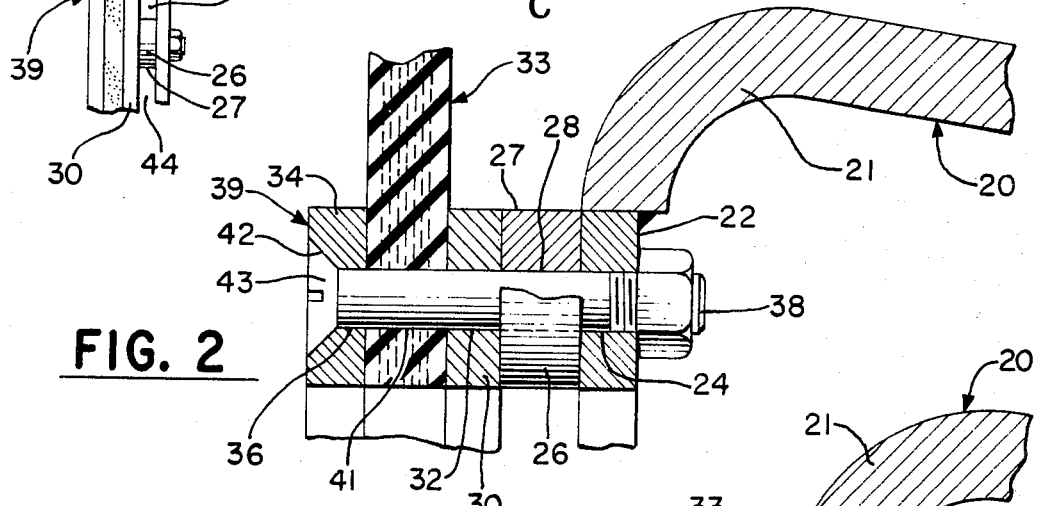
FIG. 2 is an enlarged fragmentary sectional view taken in a radial plane containing the axis of rotation of the rim illustrating the embodiment of FIG. 1 of the tire sidewall protector shield assembly of the invention.
Figure 6:
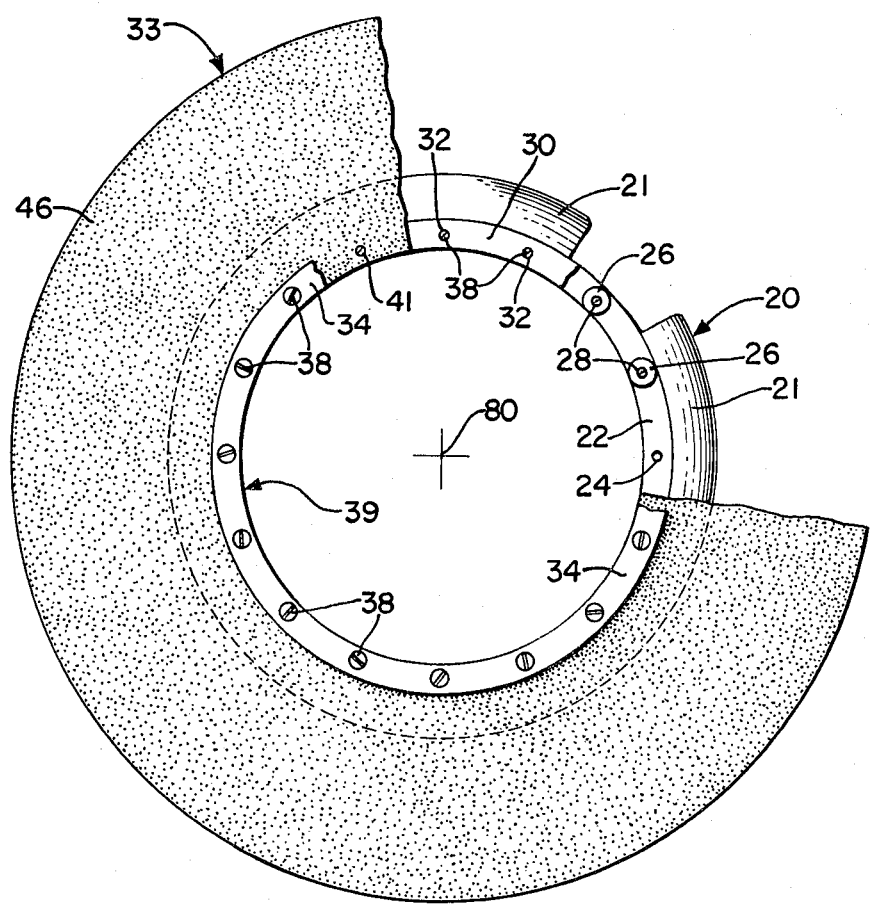
FIG. 6 is a fragmentary side elevational view further illustrating the embodiment of FIGS. 1 and 2.

Referring to FIGS. 1, 2 and 6, a tire rim 20 includes an annular tire supporting flange 21. The flange 21 has an annular, concentric, terminal portion 22 directed generally radially inwardly toward the axis of rotation of the rim which contains a plurality of circumferentially spaced apart holes 24 extending therethrough in a generally axial direction. As used herein, "axially", "axially directed" and related forms mean in a direction generally parallel to the axis of rotation of the tire rim. Engaging axially the rim flange terminal portion 22 is a plurality of spacers 26. Each spacer 26 includes an aperture 28 extending therethrough in a generally axial direction. A plurality of spacers 26 is positioned around the circumference of the rim flange terminal portion 22 at circumferentially spaced apart intervals. The apertures 28 of the spacers 26 are in alignment with the apertures 24 of the terminal portion 22. Engaging axially the spacers 26 is a first annular ring 30 having a plurality of circumferentially spaced-apart holes 32 in alignment with the holes 24 of the rim flange terminal portion 22. Engaging axially the first ring 30 is an annular resilient sidewall protection shield 33 having an inner peripheral portion 40 with a radius generally the same as the radius of the terminal portion 22 of flange 21 and holes 41 in alignment with the holes 32 of the ring 30. Engaging axially the sidewall protection shield 33 is a second ring 34 having a plurality of generally axially extending holes 36 therethrough in alignment with the holes 32 in the first annular ring 30 and holes 24 in the annular rim flange terminal portion 22. A plurality of fasteners (such as typified by bolt 38) extend in a generally axial direction through the aligned holes in the rings 30, 34, the shield 33 and the spacers 26 and the rim flange terminal portion 22 to bind these components into an assembly 39. The sidewall protection shield 33 is thereby securely attached adjacent the tire 10 but with its inner peripheral or radially innermost portion 40 spaced axially outboard from the tire 10 and rim flange 21. Because the spacers 26 are not circumferentially continuous, there is created a plurality of radially extending passages or apertures 44 at circumferentially spaced apart positions through which debris contained in a chamber 45 between the tire sidewall 14 and the sidewall protection shield 33 can exit.

As used herein, "radially", "radially directed" and related forms mean in a direction which is towards or away from the axis of rotation of the respective tire rim or the tire rim and protection shield assembly, the direction being within a radial plane of the respective tire rim or tire rim and protection shield assembly. As used herein, a "radial plane" of the tire rim or the tire rim and protection shield assembly is one which passes through and contains the axis of rotation of the respective tire rim or the tire rim and protection shield assembly.

In the embodiment of FIGS. 1 and 2 the spacers 26 are blocks 27 which are secured, preferably by welding, to the axially inboard annular ring 30. Alternatively, the spacers 26 may be integrally formed with the axially inboard ring 30, for example, by integrally machining them of the same material. As used herein, an item which is "axially inboard" of another is nearer to a centerplane CP shown in dot dash line in FIG. 1 of the respective tire rim 20 or tire rim and protection shield assembly 30. Conversely, an item which is "axially outboard" of another is farther away from the centerplane CP of the respective tire rim 20 or tire rim and protection shield assembly 39. Alternatively, the spacers 26 may be welded or integrally formed with the rim flange extension 22. Securing the spacers 26 to another annular component facilitates assembly of the sidewall protection shield and attachments to the rim 20. An adhesive or mechanical fastener may, of course, be employed to secure the spacers 26 to one of the other components of the tire rim 20 and protection shield assembly 39.

Figure 3:
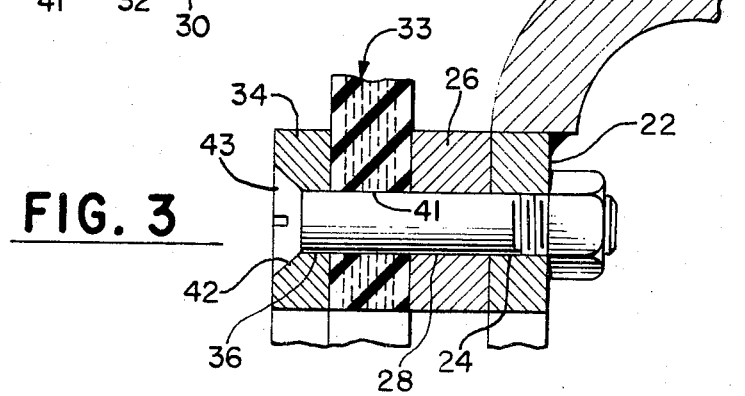
FIG. 3 is an enlarged fragmentary sectional view taken in a radial plane containing the axis of rotation of the rim illustrating yet another embodiment of the tire sidewall protector shield assembly of the invention.

In the embodiment shown in FIG. 3, the axially inboard ring 30 has been eliminated and the spacers 26 directly contact the axially inboard side of the shield 33. While fewer parts and less material are required for this embodiment than are required for the embodiment of FIGS. 1 and 2, the reduced contact area with the axially inboard side of the shield 33 may result in damage to the shield or difficulty in maintaining secure attachment of the shield. Increasing the circumferential dimension of the spacers 26 will reduce this problem but will also reduce the size or cross-sectional area of apertures 44 available for escape of debris from the chamber 45 between the shield 33 and the adjacent tire sidewall 14, which is undesirable. In the embodiment of FIG. 3, the spacers 26 may be integrally formed or welded or otherwise secured or bonded to the annular rim flange extension 22 to facilitate assembly.

Figure 4:
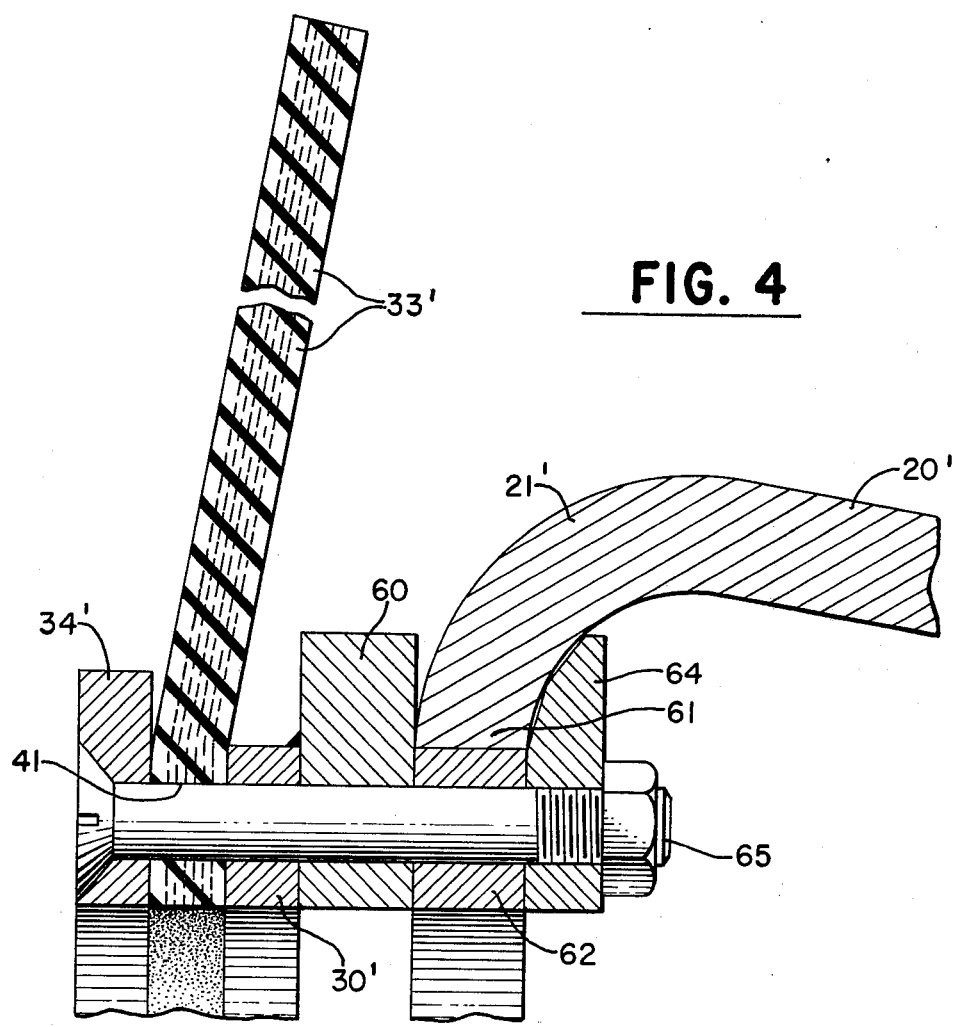
FIG. 4 is an enlarged fragmentary sectional view taken in a radial plane containing the axis of rotation of the rim illustrating yet another embodiment of the tire sidewall protector shield assembly of the invention for use with a rim not having a plurality of axially extending apertures spaced apart about the circumference of the generally radially inwardly directed terminal portion of the rim flange.

As shown in FIG. 4 a terminal portion 61 of the tire rim 20' does not include a plurality of axially extending holes 24 as in FIGS. 1, 2 and 3. In FIG. 4, the shield 33' is retained between a pair of annular rings 30',34' each having a plurality of circumferentially spaced apart bores extending in a generally axial direction therethrough and lying on a circle of the same diameter, the bores being in alignment with one another. The axially inboard ring 30' includes spacers 60 which differ from those of the embodiments shown in FIGS. 1-3 in that they are of greater radial dimension to insure that when the ring 30' is positioned concentric with the rim 20' the spacers 60 will engage the rim 20' to prevent axial movement of the ring 30' relative to the rim toward the centerplane of the rim. As used herein, the centerplane of the rim 20' is a plane (not shown) perpendicularly intersecting the axis of rotation of the rim and being located midway between the axially spaced flanges of the rim. A filler ring 62 or plurality of filler blocks (not shown) is positioned immediately radially inward of the axially outermost terminal portion 61 of the rim flange 21'. Alternatively, the filler ring 62 or blocks may be integrally formed with or secured to the spacers 60 or to clips 64. The filler ring 62 or plurality of filler blocks also contains a plurality of generally axially extending circumferentially spaced apart apertures for passage of the fasteners. A plurality of clips 64 each having a hole passing therethrough in a generally axial direction are positioned immediately axially inboard of the filler ring 62 closer to the rim centerplane than filler ring 62. The clips 64 each engage the rim flange 21' when a plurality of fasteners such as bolts 65 are inserted in the aligned apertures of the rings 30',34', spacers 60, filler ring 62 or blocks and clips 64 to draw and secure the components together. The spacers 60 and clips 64 are axially drawn toward each other to engage the rim flange 21' and thereby secure the shield 33' to the rim flange.

Figure 5:
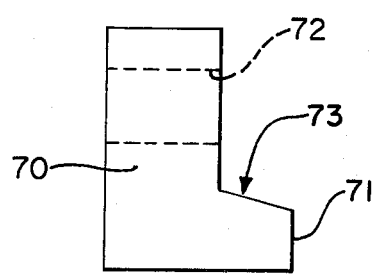
FIG. 5 is an enlarged sectional view taken of an L-shaped spacer block according to the invention.

In FIG. 5 is shown a modification of the spacers 26 for use in place of blocks 27 of FIGS. 1, 2 and 3. Each spacer block 70 is of generally L-shaped configuration when viewed in cross-section taken in a radial plane of an assembly including a spacer block 70. Each spacer block 70 includes a raised portion 71 which is of sufficient size to extend axially toward the rim centerplane from the axially outermost portion of the terminal portion of the rim flange 21 in an assembly. When the aperture 72 of spacer block 70 is aligned with one of the apertures of the terminal portion 22, the outside diameter 73 of the raised portion 71 corresponds to the inside diameter of the rim flange terminal portion 22. When spacer blocks 70 are permanently attached to ring 30, they assist in concentrically aligning the annular shield-engaging ring 30 with the rim extension 22. The spacer blocks 70 as embodied in FIG. 5 facilitate assembly of the attachment means of the invention when used in place of the blocks 27 of FIGS. 1 through 3.

The components of the attachment device of the invention may be made of any solid material having sufficient rigidity, impact resistance, compressive strength and resistance to flow under compression and are preferably made of a metal such as steel, although reinforced plastics are believed to be suitable also.

In place of each solid single-piece spacer means illustrated there may be substituted a stack of ordinary flat washers or shims. To facilitate assembly the washers within each stack may be welded together or adhesively secured to one another. Of course, the entire stack may be secured to one of the adjoining components.

It is preferred that each aperture of the annular ring 34 which is spaced further from the rim centerplane CP than the shield 33 (e.g. ring 34 of FIGS. 1, 2, 3 and 4) include an enlarged portion 42 at its end distal the centerplane of the rim. The enlarged portion 42 is provided to receive a complementary enlarged part 43 of a removable fastener such as a bolt 38 extending axially through the aperture so as to provide a smooth surface to the environment of the assembly 39. A smooth surface is desirable to prevent snagging of the fasteners and damage to the enlarged parts thereof during operation of the vehicle on which the tire sidewall shield protector shield assembly 39 is installed.

The shield 33 is a protective body resilient sheet material for absorbing impacts from rocks and other debris. The shield 33 may be formed of sections, for example, by cutting and piecing together slabs of elastomeric material to form a disc with its center removed. Preferably, however, the shield 33 is circumferentially continuous to avoid the need for fasteners which may become broken or snagged during operation of the assembly in its normally harsh environment. The shield 33 may be formed of reinforced elastomeric material, for example, textile and/or wire-reinforced rubber or a resilient plastic such as polyurethane. The shield 33 may be compressively retained by frictional forces between annular rings, for example, rings 30 and 34 in FIGS. 1 and 2 or between the spacers and an annular ring (for example, spacers 26 and annular ring 34 of FIG. 3). The shield 33 preferably includes a plurality of generally axially extending spaced apart apertures 41 about its radially innermost portion 40 in alignment with the apertures 32,36 in the corresponding rings 30,34 and spacers 26.

The shield 33 also has an outer peripheral portion 46 with a radius greater than the radius of the rim flange 21 for overlapping the sidewall 14 of the tire 10. Alternate embodiments and modifications of the shield are described in co-pending Application No. 57,780, of George T. Watts, filed on July 16, 1979, for Tire Sidewall Protector Shield Assembly, and commonly assigned herewith.

Although the tire rim 20 and protection shield 33 shown and described includes a shield for one sidewall 14 of a tire, it is understood that both sidewalls 14,15 of the tire 10 may be protected in like manner.

The shield has been shown and described as being secured to a terminal portion of the flange of a single component rim. It is understood that when a multipiece rim is employed, one of the rim components may, of course, be formed so as to provide an equivalent mounting site for the shield and spacer means.

While the use of a plurality of spacers (numeral 26 in FIGS. 1, 2, 3 and 6, numeral 60 in FIG. 4 and numeral 70 in FIG. 5) has been described in detail, it is to be understood that a single spacer member having at least one radially extending passsage may be employed in place of a plurality of spacers, it being essential that when the shield is secured to the tire rim there is provided at least one radially extending passage between the rim and the shield for removal of material accumulating during operation.

While certain representative embodiments and details have been shown for the purpose of illustrating the invention, it will be apparent to those skilled in this art that various changes and modifications may be made therein without departing from the spirit or scope of the invention.

We claim:
1. A tire rim and shield assembly comprising elements of:
 (a) a tire rim having a tire-supporting flange axially spaced from the centerplane of said rim;
 (b) an annular resilient shield fastened to said flange and extending radially outwardly from a position adjacent said flange to a position radially outwardly of said flange;
 (c) spacing means interposed between said shield and said flange such that there is provided at least one radially extending passage between said rim and said shield for removal of material accumulating during operation.

2. The assembly of claim 1, further comprising:
(a) an annular ring contacting said shield, said shield being interposed between said ring and said spacing member.

3. The assembly of claim 1, further comprising:
(a) a first annular ring contacting said spacing means, said first annular ring being interposed between said shield and said spacing means and
(b) a second annular ring contacting said shield, said shield being interposed between said second ring and said spacing means.

4. The assembly of claim 1, 2 or 3, wherein said spacing means includes a plurality of spacers positioned apart from one another about the circumference of said flange.

5. The assembly of claim 4, wherein one of said spacers is integral with one of said elements which is axially adjacent to said spacers.

6. The assembly of claim 4, wherein at least one of said spacers comprises a stack of flat metallic washers.

7. The assembly of claim 4, wherein at least one of said spacers is of generally L-shaped configuration when viewed in cross section taken in a radial plane of an assembly including one of said spacers.

8. The assembly of claim 1, 2 or 3, wherein said rim flange includes a terminal portion directed generally radially inwardly toward the axis of rotation of said rim, said terminal portion including a plurality of apertures spaced apart about its circumference, said apertures extending through said terminal portion in a direction generally parallel to said axis.

9. The assembly of claim 8, further comprising a plurality of clips positioned apart from one another about the circumference of and in contact with said rim flange terminal portion, each of said clips having an aperture extending therethrough generally parallel to said axis, said clips contacting that surface of said terminal portion nearest said centerplane.

10. The assembly of claim 1, 2 or 3, wherein the shield is a continuous annulus of reinforced elastomeric material.

11. The assembly of claim 1, 2 or 3, further comprising removable fastening means extending in a direction generally parallel to the axis of rotation of said rim.

12. The assembly of claim 2, wherein said annular ring includes a plurality of apertures spaced apart about the circumference of said ring and extending therethrough generally parallel to the axis of rotation of said rim, each of said apertures being enlarged at its end distal said centerplane.

13. The assembly of claim 3, wherein said second annular ring includes a plurality of apertures spaced apart about the circumference of said rim and extending therethrough generally parallel to the axis of rotation of said rim, each of said apertures of said second ring being enlarged at its end distal said centerplane.

14. A tire rim and shield assembly comprising elements of
(a) a tire rim having a tire-supporting flange axially spaced from the centerplane of said rim, said flange including a terminal portion directed generally radially inwardly toward the axis of rotation of said rim, said terminal portion including a plurality of apertures spaced apart about its circumference, said apertures extending through said terminal portion in a direction generally parallel to said axis;
(b) a plurality of spacers contacting said terminal portion in a direction generally parallel to said axis, said spacers being positioned apart from one another about the circumference of said terminal portion, each of said spacers having an aperture extending therethrough generally parallel to said axis, each of said spacer apertures being in alignment with a corresponding one of said apertures of said flange portion;
(c) a first annular ring contacting said plurality of spacers in a direction generally parallel to said axis, said first ring having a plurality of apertures extending therethrough generally parallel to said axis, said apertures of said first ring being spaced apart from one another about the circumference of said first ring and being in alignment with said apertures of said terminal portion;
(d) a second annular ring having a plurality of apertures extending therethrough generally parallel to said axis, said apertures of said second ring being spaced apart about the circumference of said second ring and being in alignment with said apertures of said flange portion, each of said apertures of said second ring being enlarged at its end distal said centerplane;
(e) an annular resilient shield interposed between said first and second rings, said shield extending radially outwardly of said axis from said first ring; and
(f) removable fastening means passing through said aligned apertures of said elements in a direction generally parallel to said axis;
there being provided between said terminal portion and first annular ring a plurality of radially extending passages for removal of material accumulating during operation.

15. The assembly of claim 14, wherein one of said spacers is integral with one of said elements which is axially adjacent to said spacers.

* * * * *